(No Model.)

C. J. McCLOSKEY.
NUT LOCK.

No. 558,658.  Patented Apr. 21, 1896.

WITNESSES:
P. H. Aagke.
Wm. C. Wiedersheim.

INVENTOR
Charles J. McCloskey
BY
ATTORNEY.

UNITED STATES PATENT OFFICE.

CHARLES J. McCLOSKEY, OF PHILADELPHIA, PENNSYLVANIA, ASSIGNOR OF ONE-HALF TO RICHARD McCLOSKEY, OF SAME PLACE.

NUT-LOCK.

SPECIFICATION forming part of Letters Patent No. 558,658, dated April 21, 1896.

Application filed August 22, 1895. Serial No. 560,088. (No model.)

*To all whom it may concern:*

Be it known that I, CHARLES J. MCCLOSKEY, a citizen of the United States, residing in the city and county of Philadelphia, State of Pennsylvania, have invented a new and useful Improvement in Nut-Locks, which improvement is fully set forth in the following specification and accompanying drawings.

My invention consists of a novel construction of nut-lock in which a locking device is employed which is readily applied and securely and effectively held in place, means being also provided for readily and expeditiously removing the same when required.

It further consists of novel details of construction, all as will be hereinafter set forth.

Figure 1:
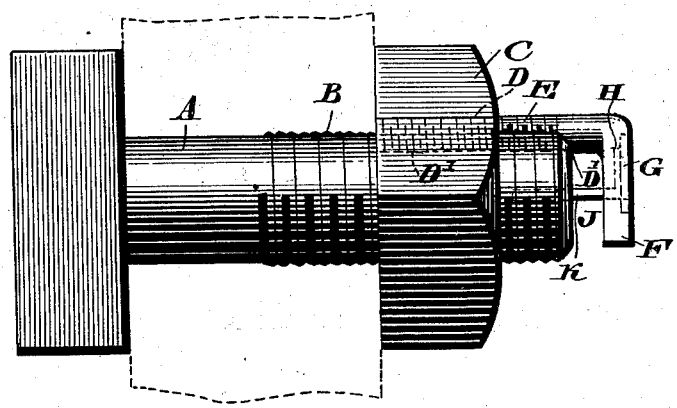
Figure 2:
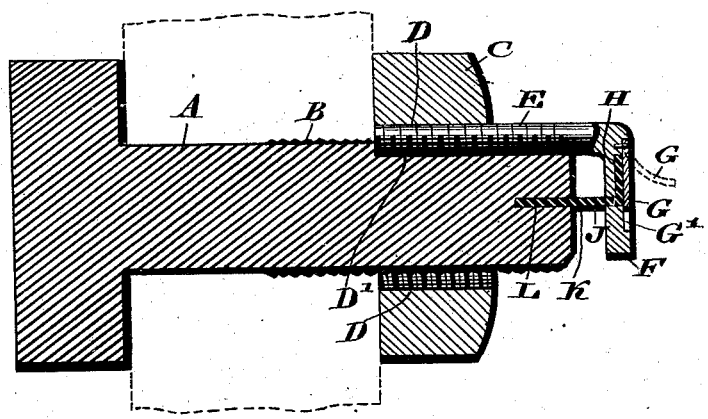
Figure 3:
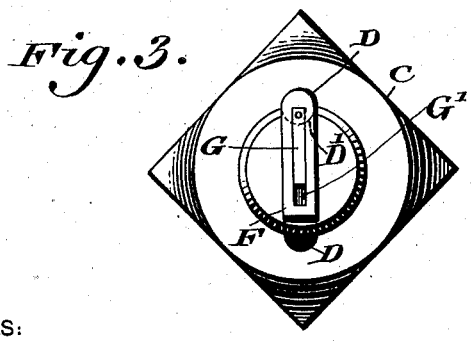

Figure 1 represents an exterior view of a nut-lock and its adjuncts embodying my invention. Fig. 2 represents a longitudinal sectional view of the same. Fig. 3 represents an end elevation thereof.

Similar letters of reference indicate corresponding parts in the several figures.

Referring to the drawings, A designates a bolt, and C designates a nut, which is fitted on the threads B of said bolt, that portion of the internal periphery of said nut which is in alinement with a diagonal of the latter, being provided with the semicylindrical threaded recesses D, which may be oppositely arranged, the location of the same being best seen in Fig. 3, it being evident that the nut is not weakened by the location of said recesses, the bolt A being also provided with a semicylindrical threaded recess adapted to be in alinement with either of said recesses D.

E designates a threaded stem which is provided with a deflected member F.

G designates a spring which is secured to the head F and is seated in a suitable recess G' therein, said spring bearing against the limb H of the arm J, whose limb or stem K enters the longitudinal recess L in the bolt A, said limb H occupying a recess communicating with the recess G'.

The operation is as follows: The nut C having been screwed upon the bolt or shank to the proper distance, the stem E is screwed into the recesses D D'. The spring G is now lifted and the arm J is inserted in the recess L, and the spring returns to its normal position, controlling the arm J, whereby the nut cannot rotate and thus unscrew, it being evident that a simple and effective device is produced, and one which can be readily released by raising the spring G, withdrawing the arm J, and unscrewing the stem E, whereby the nut may be rotated in order to be removed from the bolt.

Having thus described my invention, what I claim as new, and desire to protect by Letters Patent, is—

1. A nut-lock consisting of a bolt and nut, each having a threaded recess therein, a locking device therefor, the same consisting of a threaded stem adapted to engage the threaded recesses said stem having a deflected member, and a device adapted to engage with the latter and prevent it from rotation, substantially as described.

2. In a nut-lock, a nut and a bolt, each having a threaded recess D therein, a locking device consisting of the threaded stem E having the deflected member F, and an angular-shaped holder J, having the members K and H, said portion F being provided with a spring G, adapted to engage said member H, substantially as described.

3. In a nut-lock, the bolt A having the shank B, and the nut C, the latter having threaded recesses diagonally arranged, a locking device consisting of a threaded stem E, and a deflected member F, a spring G attached to the latter, an angular-shaped holder J, consisting of the members K and H, adapted to engage the bolt and the member F respectively, said spring G holding said member H in position, substantially as described.

CHARLES J. McCLOSKEY.

Witnesses:
JOHN A. WIEDERSHEIM,
R. H. GRAESER.